United States Patent

[11] 3,622,182

| [72] | Inventor | Tony W. Grosse-Rhode |
| | | 8233 Keystone Drive, Omaha, Nebr. 68134 |
| [21] | Appl. No. | 876,530 |
| [22] | Filed | Nov. 13, 1969 |
| [45] | Patented | Nov. 23, 1971 |

[54] WIDE-RANGE TOW HITCH
16 Claims, 6 Drawing Figs.

[52] U.S. Cl. ................................................. 280/478 A,
 280/499
[51] Int. Cl. ................................................. B60d 1/00
[50] Field of Search .......................................... 280/478,
 477, 478 B, 478 A

[56] References Cited
UNITED STATES PATENTS

| 1,068,334 | 7/1913 | Goodhue | 280/478 B UX |
| 2,357,540 | 9/1944 | Palmer | 280/478 A |
| 2,973,971 | 3/1961 | Oddson | 280/478 B |
| 2,820,649 | 1/1958 | Demarest | 280/478 B |
| 2,871,029 | 1/1959 | Demarest | 280/477 |

Primary Examiner—Leo Friaglia
Attorneys—Clarence A. O'Brien and Harvey B. Jacobson ABSTRACT: An elongated hitch bar housing having front and rear ends including front longitudinally extending guide means and rear horizontal transverse guide means, respectively. An elongated hitch bar is disposed lengthwise of the housing and including front follower means guidingly engaged with the front guide means and its rear end is longitudinally shiftable relative to and guidingly engaged with the rear guide means for limited horizontal swinging movement to opposite sides of a center position. In addition, the rear end of the housing includes swingable abutment arms pivotally supported at one pair of ends from remote sides of the rear guide means with the other pair of ends thereof projecting toward each other and juxtaposition the opposite sides of the rear end of the bar when the latter is horizontally centered. The other pair of ends of the arms are swingable rearwardly and outwardly away from each other to provide clearance therebetween for horizontal swinging movement of the rear end of the bar as the latter is displaced rearwardly from its forwardmost limit position and the arms are spring biased to generally aligned positions with their free-swinging ends closely opposing the opposite sides of the rear end of the bar.

PATENTED NOV 23 1971

Tony W. Grosse - Rhode
INVENTOR.

BY Clarence A. O'Brien
and Harvey B. Jacobson
Attorneys

3,622,182

Tony W. Grosse-Rhode
INVENTOR.

WIDE-RANGE TOW HITCH

The tow hitch of the instant invention has been designed for support from either a towing vehicle or a vehicle to be towed and to provide a means whereby a relatively stationary trailer tongue may be operably connected to a towing vehicle without the vehicle being precisely positioned relative to the trailer tongue.

Assuming that the two hitch is supported from a towing vehicle, the trailer hitch includes a drawbar portion which may be longitudinally shifted between extended and retraced limit positions and releasably secured in its retracted limit position. The drawbar, when released from its retracted limit position, may be extended with its free extended end toward either side of a center position for juxtaposition relative to and for connection with the forward end of a trailer tongue. Then, after the trailer tongue has been connected to the rear end of the drawbar, the vehicle from which the two hitch is supported may be backed relative to the trailer with its front wheels turned so as to swing the drawbar to its centered position and swinging of the drawbar to the centered position will automatically lock the drawbar against horizontal displacement to either side of its centered position. Of course, backing the vehicle relative to the trailer will also forwardly displace the drawbar to its forwardmost limit position in which the drawbar may then be latched for towing the trailer forwardly.

The drawbar is further constructed of components which may be readily produced using conventional manufacturing processes and at a reasonably low cost, whereby the tow bar may be marketed at a reasonably low cost to the consumer.

The main object of this invention is to provide a wide-range tow hitch of the type enabling the attachment of a trailer tongue portion to a towing vehicle without the trailer tongue and towing vehicle being precisely positioned relative to each other.

Another object of this invention in accordance with the immediately preceding object, is to provide a wide-range tow hitch constructed in a manner whereby only one movement of the towing vehicle relative to the trailer is required after initially coupling the trailer tongue to the tow hitch in order to position the horizontally swingable and rearwardly displaceable tow bar portion of the hitch in its centered forwardmost position for towing the trailer.

It is a still further object of this invention to provide a tow hitch in accordance with the preceding objects and which is constructed in a manner such that it may be readily attached to the rear end of any potential towing vehicle.

A final object of this invention to be specifically enumerated herein is to provide a wide-range tow hitch which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
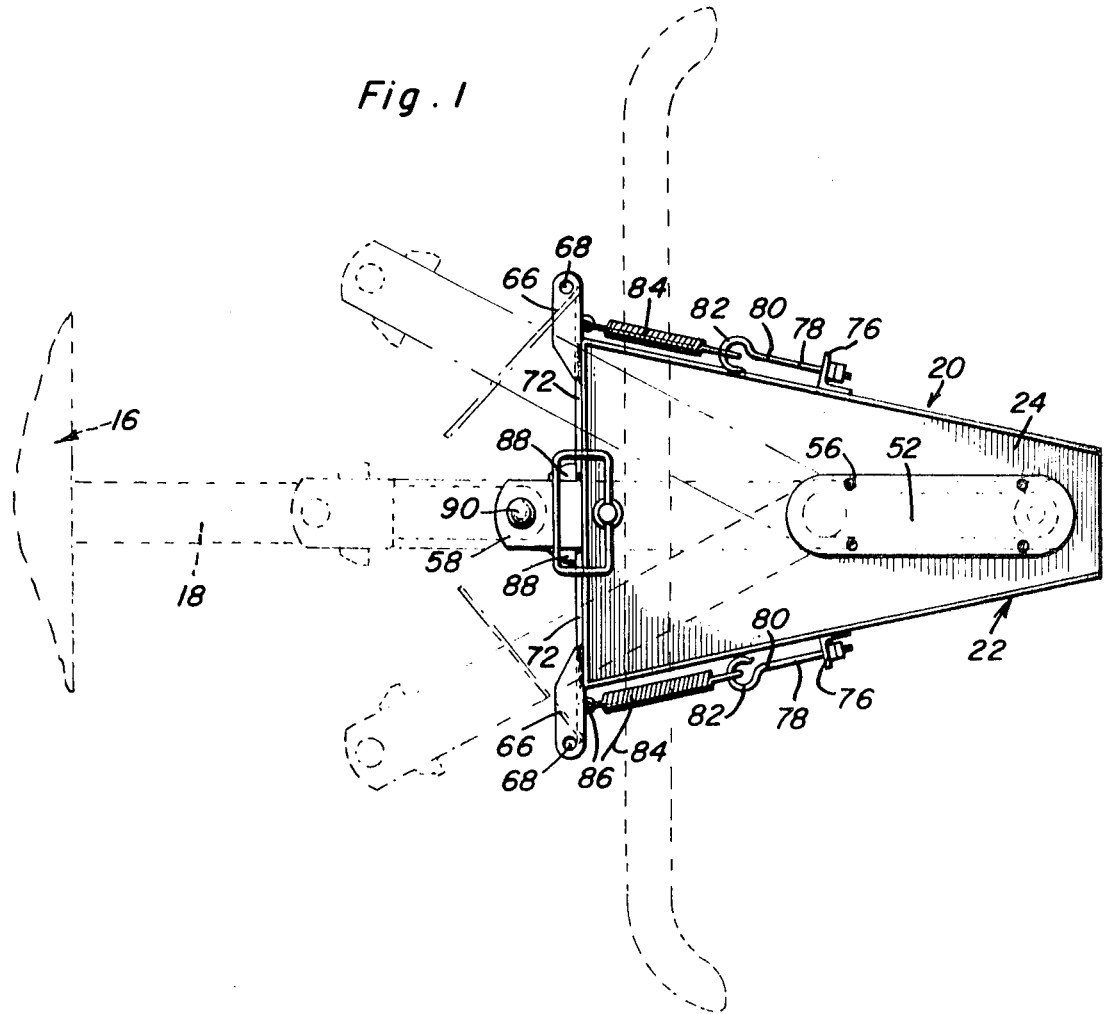
FIG. 1 is a top plan view of the tow hitch with alternate rearwardly extended positions of the drawbar portion of the hitch illustrated in phantom lines.
Figure 2:
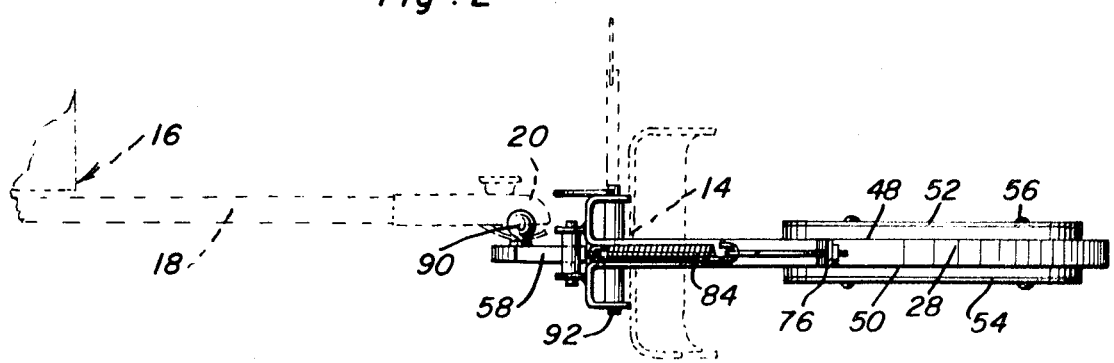
FIG. 2 is a side elevational view of the assemblage illustrated in FIG. 1.

Referring now more specifically to the drawings, the numeral 10 generally designates a vehicle including a rear transversely extending bumper 12 having an opening 14 therein. THe numeral 16 generally designates a trailer including a forwardly projecting tongue 18 and the forward end of the tongue 18 includes a socket hitch element 20.

The wide-range tow hitch of the instant invention is referred to in general by the reference numeral 22 and includes an elongated longitudinally extending housing referred to in general by the reference numeral 22. The housing 22 includes a pair of upper and lower plates 24 and 26 including rearwardly divergent opposite side edges and generally parallel and transversely extending front and rear edges. The opposite side marginal edge portions of the upper and lower plates 24 and 26 are interconnected by means of upstanding rearwardly divergent sideplates 28 secured at their upper and lower marginal portions to the upper and lower plates 24 and 26 and the rear ends of the plates 24 and 26 terminate in upwardly and downwardly directed flange portions 24' and 26' which in turn terminate at their upper and lower edges, respectively, in rearwardly directed flange portions 24'' and 26''.

The plates 24 and 26 have vertically registered apertures 30 and 32 formed therein and the flanges 24'' and 26'' have openings or apertures 34 and 36 formed therein which are vertically registered with the openings or apertures 30 and 32. An upper sleeve 38 is secured between confronting surfaces of the plate 24 and the flange 24' in registry with the apertures 30 and 34 and a lower sleeve 40 is secured between the confronting surfaces of the plate 26 of the flange 26' in registry with the apertures 32 and 36.

A horizontally disposed transversely extending slot 42 is defined between the rear marginal edge portions of the plates 24 and 16 and the opposite sideplates 28.

The upper plate 24 has a longitudinal slot 44 formed in its forward end and which includes rounded opposite ends while the plate 26 has a slot 46 formed in its forward end and which also includes rounded opposite ends. A pair of oval frame members 48 and 50 are disposed over the upper surface of the plate 24 beneath the lower surface of the plate 25 in registry with the slots 44 and 46 and top and bottom cover plates 52 and 54 are placed over the upper frame 48 beneath the lower frame 50. Further, a plurality of fasteners 56 are utilized to secure the cover plates 52 and 54 as well as the frames 48 and 50 to the plates 24 and 26.

Figure 5:
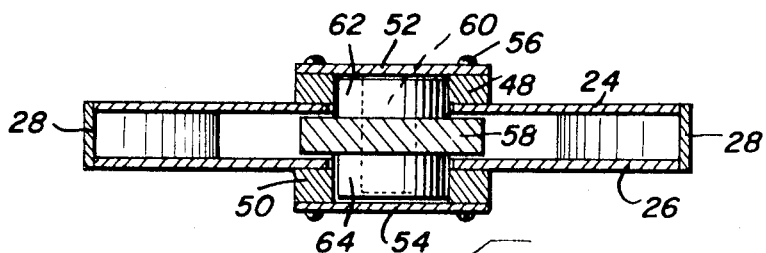
FIG. 5 is a transverse vertical sectional view taken substantially upon the plane indicated by section line 5—5 of FIG. 4 and on somewhat of an enlarged scale.

An elongated bar 58 extends longitudinally of and is slidably disposed within the housing 22 between the upper and lower plates 24 and 26 thereof. The rear end of the bar 58 has a vertically extending stub shaft 60 secured therethrough including upper and lower ends which project above and below the bar 58 and upper and lower ball bearings 62 and 64 are journalled on the upper and lower ends of the stub shaft 60 and slidingly received in the oval frames 48 and 50. From FIG. 5 of the drawings it may be seen that the internal dimensions of the frames 48 and 50 are identical and slightly less than the dimensions of the slots 44 and 46. Further, the fasteners 56 are through fasteners which clampingly secure the cover plates 52 and 54 as well as the frames 48 and 50 to the plates 24 and 26. Also, from FIG. 5 of the drawings it will be seen that the vertical thickness of the bar 58 is slightly less than the vertical spacing between the opposing under and upper surfaces of the plates 24 and 26.

Figure 3:
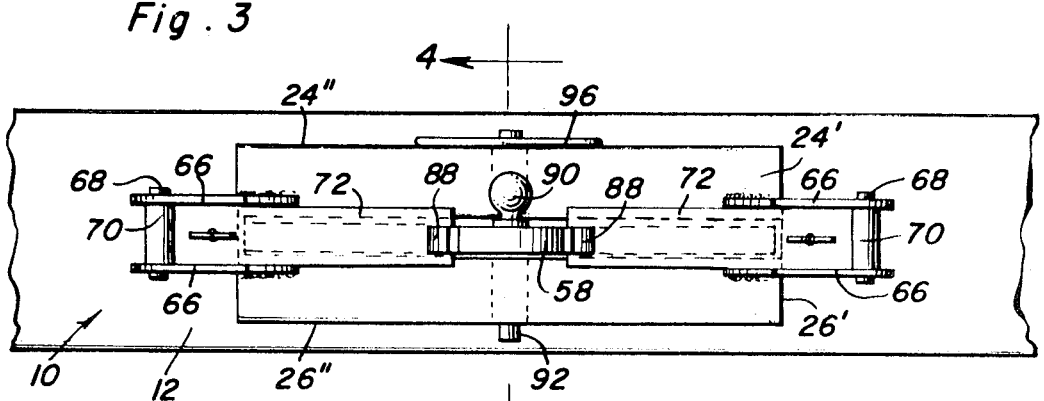
FIG. 3 is a rear elevational view of the tow hitch as secured to the rear end of a towing vehicle.
Figure 6:
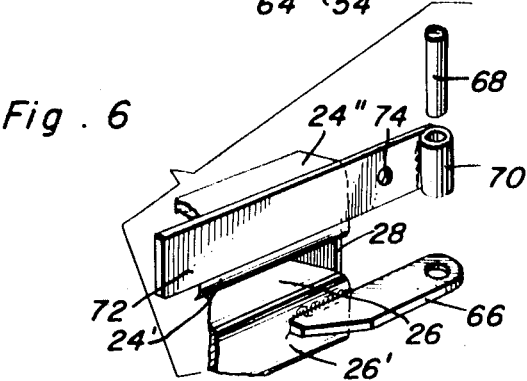
FIG. 6 is a fragmentary perspective view of the right-hand rear corner of the tow hitch illustrating the manner in which the left-hand swingable abutment arm is supported from the rear end of the housing portion of the hitch.

With attention now invited more specifically to FIGS. 3 and 6 of the drawings it may be seen that the opposite end portions of each of the flanges 24' and 26' has a pair of apertured mounting plates 66 secured thereto. A pivot pin 68 is secured between each pair of corresponding mounting plates 66 and a pair of sleeves 70 secured to the remote ends of a pair of opposite side abutment arms 72 are journalled on the pivot pin 68. Each of the arms 72 is apertured as at 74 and it may be seen from FIG. 1 of the drawings that when the bar 58 is in the centered position the opposing ends of the arms 72 are spaced closely adjacent the opposite side surfaces of the bar 58.

The sideplates 28 each include apertured L-shaped mounting brackets 76 through which shank portion 78 of hook bolts 80 including hooked end portions 82 are secured. A pair of expansion springs 84 have one pair of corresponding ends thereof anchored to the hooked end portions 82 while the other pair of corresponding ends of the expansion springs 84 are anchored to eye-bolts 86 secured through the apertures 74. Accordingly, the abutment arms 72 are yieldingly urged from the phantom line positions thereof illustrated in FIG. 1 of the drawings to the solid line positions thereof illustrated in FIG. 1.

With attention now invited more specifically to FIGS. 1 and 3 of the drawings, it may be seen that the rear end portion of the bar 58 includes a pair of opposite side abutments 88 for engagement with the rear surfaces of the adjacent ends of the abutment arms 72 when the latter are positioned as illustrated in solid lines in FIG. 1 of the drawings to limit forward displacement of the bar 58. In addition, forward displacement of the bar 58 is also limited by the bearings or bearing assemblies 62 seating in the forward rounded ends of the frames 48 and 50.

Figure 4:
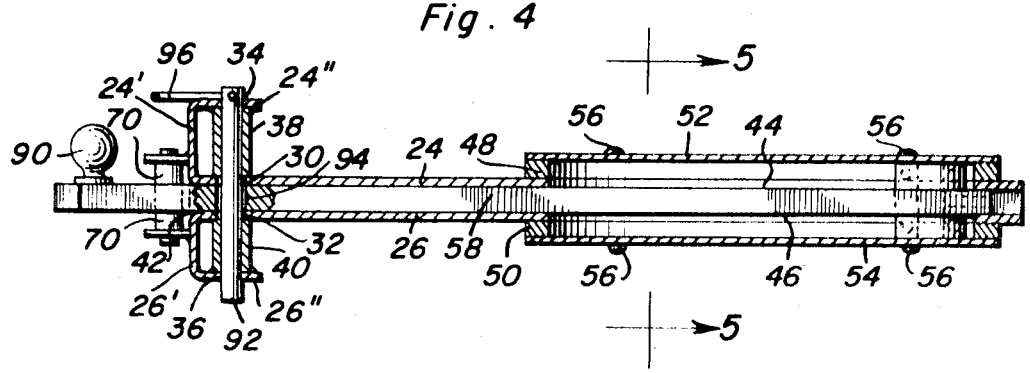
FIG. 4 is a longitudinal vertical sectional view taken substantially upon the plane indicated by section line 4—4 of FIG. 3.

The rear end of the bar 58 has a ball hitch element 90 supported therefrom and an anchor pin is provided and downwardly insertable through the aperture 34, the sleeve 38, the aperture 30, an aperture 94 formed in the rear end portion of the bar 58, the aperture 42, the sleeve 40 and the aperture 36. Of course, when the pin 92 is in position as illustrated in FIG. 4 of the drawings, the bar 58 is further locked against longitudinal displacement relative to the housing 22 and also against lateral displacement in the slot 42. It may also be seen from FIG. 4 of the drawings that the upper end of the pin 92 includes a bail-type handle 96 to facilitate removal of the pin 92, when desired.

In operation, and when it is desired to couple the trailer 16 to the hitch 20, the vehicle 10 is backed into close proximity with the forward end of the tongue 18. Then, the pin 92 is withdrawn and the rear end portion of the bar 58 is rearwardly displaced relative to the housing 22 while applying pressure to laterally displace the rear end of the bar 58 in whatever direction it is necessary to register the ball hitch element 90 beneath the socket hitch element 20. Lateral deflection of the rear end portion of the bar 58 during its rearward extension will cause frictional engagement between the bar 58 and the corresponding abutment arm 72 so as to swing the free end of that arm 72 rearwardly as the bar 58 is being rearwardly displaced. Then, the socket hitch element 20 is coupled to the ball hitch element 90 and the vehicle 10 may be backed in a manner to as to cause the rear end of the bar 58 to swing to the center position thereof while the bar 58 is being retracted forwardly into the housing 22. As soon as the bar 58 has reached a centered position, the abutment arm which was swung rearwardly will swing forwardly to its limit position illustrated in FIG. 1 of the drawings and continued rearward movement of the vehicle 10 will cause the bar 58 to reach its forwardmost limit position. Then, the vehicle is stopped and the pin 92 is reinserted whereby the vehicle 10 may then proceed in a forward direction in order to tow the trailer 16.

Although the pin 92 is not automatically reinsertable, if, when the socket hitch element 20 is coupled to the ball hitch element 90, the rear end of the bar 58 has not been laterally displaced so as to move the bar 58 out of registry with the aperture 30, the pin 92 may be reinserted before the vehicle 10 is backed in order to center the bar 58 and forwardly retract the latter to its forwardmost limit position. Then, as the aperture or bore 94 moves into registry with the aperture 30, the pin 92 will automatically drop through the bar 58 and lock the latter in its forwardmost limit position thus enabling the driver of the vehicle 10 to then proceed in a forward direction without having to dismount from the vehicle and place the pin 92 in position.

As hereinbefore set forth, the hitch 20, although specifically illustrated and described as supported from the towing vehicle, may also be supported from the trailer 16 whereby the free end of the bar 58 may be provided with a socket hitch element such as socket hitch element 20 for removable coupling with a ball hitch element such as ball hitch element 90 carried by the towing vehicle.

In any event, it still requires only one backing movement of the towing vehicle in order to telescope the bar 58 toward its fully retracted position and in its predetermined centered position received between the adjacent ends of the arms 72 when the latter are disposed in coplanar relation.

When backing the towing vehicle in order to retract the towing bar 58, while it is desirable that the towing vehicle be turned whereby the rear end of the bar 58 will be swung toward its centered position of oscillation, as long as the trailer 16 is free to swing horizontally in order to horizontally displace the forward end of the towing tongue thereof, it is not absolutely necessary that the towing vehicle be turned while backing in order to center the bar 58 inasmuch as the free end of the rearwardly swung arm 72 is engageable by the corresponding abutment 88 whereby that arm will be swung inwardly toward the slot 42 upon further inward movement of the bar 58 relative to the housing 22. Therefore, even if the vehicle is not properly aligned with the trailer 16 when the vehicle is backed relative to the trailer 16 in order to telescope the bar 58 into its retracted position, the free end of the arm 72 which is swung rearwardly will be engaged by the corresponding abutment 88 to thereby cam the rear end of the bar 58 toward its centered position as the bar 58 moves to its final fully retracted position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A hitch construction for attaching the front end of a trailer vehicle to the rear end of a towing vehicle, said hitch construction comprising an elongated generally horizontally disposed housing including first and second ends and adapted for securement to one of said vehicle ends with the housing extending lengthwise of said one vehicle and said second end facing endwise outwardly of said one vehicle end, said second end of said housing defining an elongated horizontal transversely extending slot opening into said housing, an elongated tow bar having one end portion telescoped into said second end of said housing, said one end portion of said bar and said first end of said housing including first coating means guidingly supporting said one end portion within said housing for limited longitudinal shifting relative thereto and for oscillation of said one end portion relative to said housing about an upstanding axis, whereby said bar may be shifted longitudinally of said housing and the other end portion of the bar may be swung horizontally through said slot to opposite sides of a predetermined angularly disposed position with said bar generally centered in said slot, said housing and bar including second coacting means operative to releasably lock said bar in a predetermined longitudinally displaced position relative to said housing and in said predetermined angularly displaced position, said second coacting means including a pair of abutment arms extending transversely of the opposite sides of the second end of said housing and having their remote ends pivotally supported from said housing for limited swinging of the adjacent ends of said arms outward of said second end of said housing in a generally horizontal plane, the free adjacent ends of said arms, when swung inwardly to their innermost limit positions, closely opposing the opposite sides of said other end portion of said bar when the latter is in its predetermined position of oscillation.

2. The combination of claim 1 including means yieldingly urging said arms to said innermost limit position.

3. The combination of claim 2 wherein said other end portion of said bar projects outwardly from said second end of said housing when said bar is disposed in its innermost limit position, said other end portion of said bar including opposite side outwardly projecting abutments closely overlying the outer surfaces of the adjacent swingable ends of said arms when said bar is fully retracted and said arms are disposed in their innermost positions.

4. The combination of claim 1 wherein said housing includes top and bottom panels closely overlying and underlying the upper and lower surfaces of said bar, said second coacting means comprising registered apertures formed in said top and bottom panels and said bar and an upstanding lockpin passing through said registered apertures.

5. The combination of claim 4, wherein the upper end of said pin includes a bail-type handle.

6. A hitch construction for attaching the front end of a trailer vehicle to the rear end of a towing vehicle, said hitch construction comprising an elongated generally horizontally disposed housing including first and second ends and adapted for securement to one of said vehicle ends with the housing extending lengthwise of said one vehicle and said second end facing endwise outwardly of said one vehicle end, said second end of said housing defining an elongated horizontal transversely extending slot opening into said housing, an elongated tow bar having one end portion telescoped into said second end of said housing, said one end portion of said bar and said first end of said housing including first coacting means guidingly supporting said one end portion within said housing for limited longitudinal shifting relative thereto and for oscillation of said one end portion relative to said housing about an upstanding axis, whereby said bar may be shifted longitudinally of said housing and the other end portion of the bar may be swung horizontally through said slot to opposite sides of a predetermined angularly disposed position with said bar generally centered in said slot, said housing and bar including second coacting means operative to releasably lock said bar in a predetermined longitudinally displaced position relative to said housing and in said predetermined angularly displaced position, said housing including top and bottom panels closely overlying and underlying the upper and lower surfaces of said bar, said second coacting means comprising registered apertures formed in said top and bottom panels and said bar and an upstanding lockpin passing through said registered apertures, the marginal edge portions of the top and bottom panels of said housing at said second end thereof terminate in upwardly and downwardly extending flanges, respectively, which in turn terminate in generally horizontal flanges projecting toward said first end of said housing, said second coacting means also including bores formed through said horizontal flanges and registered with the apertures in said top and bottom panels and an upstanding sleeve secured between each of said panels and the corresponding flange in registry with said apertures and bore, said upstanding pin also passing through said bores and sleeves as well as said apertures.

7. The combination of claim 1 wherein said housing includes top and bottom panels, said first coacting means including a pair of registered longitudinal slots formed in said top and bottom panels and an upstanding shaft secured through said one end portion of said bar including upper and lower ends slidingly received in said slots.

8. The combination of claim 7 wherein said first coacting means further includes elongated upper and lower open frames including parallel sides secured to the upper and lower surfaces of said top and bottom panels, respectively, in registry with said slots and a pair of bearing assemblies journalled on the upper and lower ends of said shaft and guidingly received in said frames.

9. The combination of claim 8 wherein the opposite ends of said frames are rounded for seatingly receiving said bearing assemblies therein to establish the limits of longitudinal shifting of said bar relative to said housing.

10. A hitch construction for attaching the front end of a trailer vehicle to the rear end of a towing vehicle, said hitch construction including an elongated generally horizontally disposed guide structure including first and second ends and adapted for securement to one of said vehicle ends with the guide structure extending lengthwise of said one vehicle and said second end facing endwise outwardly of said one vehicle end, said second end of said guide structure defining an elongated horizontal transversely extending swing area, an elongated two bar having one end portion supported from said guide structure for guided longitudinal shifting along said guide structure and free angular displacement about an upstanding axis for extension and retraction as well as swinging of the other end portion of said bar relative to said second end of said guide structure, said guide structure and said bar including first coacting means operative to releasably lock said bar against free angular displacement about said axis from a predetermined position of angular displacement while allowing longitudinal shifting of said bar along said guide structure, said first coacting means including a pair of abutment arms extending transversely of said second end of said guide structure and disposed in registry with opposite ends of said swing area, said arms having their remote ends pivotally supported from said guide structure for limited swinging of the adjacent ends of said arms outward of the second end of said guide structure, the free adjacent ends of said arms, when swung inwardly to their innermost limit positions, closely opposing the opposite sides of the other end portion of said bar when the latter is in its predetermined position of oscillation.

11. The combination of claim 10 including means yieldingly urging said arms to said innermost limit position.

12. The combination of claim 11 wherein said other end portion of said bar projects outwardly from said second end of said housing when said bar is disposed in its innermost limit position, said other end portion of said bar including opposite side outwardly projecting abutments closely overlying the outer surfaces of the adjacent swingable ends of said arms when said bar is fully retracted and said arms are disposed in their innermost positions.

13. A hitch construction for attaching the front end of a trailer vehicle to the rear end of a towing vehicle, said hitch construction including guide structure for securement to one of said vehicle ends, an elongated tow bar having one end portion supported from said guide structure for guided longitudinal reciprocal shifting relative to said guide structure and free limited angular displacement about an upstanding axis for extension and retraction as well as free swinging of the other end portion of said bar relative to said guide structure, a pair of abutment arms supported from said guide structure on opposite sides of the other end portion of said tow bar for swinging about upstanding axis between generally aligned positions with their free ends adjacent but spaced from each other with said other end portion of said tow bar disposed therebetween and second positions with said abutment arms swung endwise outwardly from said other end portion of said bar and away from longitudinal centerline thereof, said other end portion of said bar being engageable with free end portions of said abutment arms when the latter are in said aligned positions for preventing angular displacement of said tow bar about the first-mentioned axis when said abutment arms are in said aligned positions.

14. The combination of claim 13 wherein said guide structure and bar include coacting means operable to releasably lock said bar in said retracted position.

15. The combination of claim 14 wherein said abutment arms and bar include coacting means locking said abutment arms against swinging from said aligned positions when said bar is in said retracted position.

16. The combination of claim 15 including means operatively connected between said abutment arms and said guide structure yieldingly biasing said abutment arms toward said aligned positions.

* * * * *